United States Patent
Fernback et al.

(10) Patent No.: US 9,870,705 B2
(45) Date of Patent: Jan. 16, 2018

(54) SYSTEM AND METHOD FOR PROVIDING ALERT NOTIFICATIONS TO A VEHICLE OCCUPANT

(71) Applicants: TomTom International B.V., Amsterdam (NL); TomTom Development Germany GmbH, Leipzig (DE)

(72) Inventors: Sean Fernback, Amsterdam (NL); Ralf Peter Schäfer, Berlin (DE)

(73) Assignee: TOMTOM TRAFFIC B.V., Amsterdam (NL)

(*) Notice: Subject to any disclaimer, the term of this patent is extended or adjusted under 35 U.S.C. 154(b) by 0 days.

(21) Appl. No.: 14/651,235

(22) PCT Filed: Dec. 11, 2013

(86) PCT No.: PCT/EP2013/076249
§ 371 (c)(1),
(2) Date: Jun. 11, 2015

(87) PCT Pub. No.: WO2014/090884
PCT Pub. Date: Jun. 19, 2014

(65) Prior Publication Data
US 2015/0325124 A1  Nov. 12, 2015

(30) Foreign Application Priority Data
Dec. 11, 2012  (GB) .................................. 1222198.2

(51) Int. Cl.
*G08G 1/0968* (2006.01)
*G08G 1/09* (2006.01)
(Continued)

(52) U.S. Cl.
CPC ........... *G08G 1/0968* (2013.01); *G08G 1/092* (2013.01); *G08G 1/096716* (2013.01);
(Continued)

(58) Field of Classification Search
CPC ................. G08G 1/0968; G08G 1/091; G08G 1/096716; G08G 1/096741; G08G 1/096775; H04W 4/06
See application file for complete search history.

(56) References Cited

U.S. PATENT DOCUMENTS 7,756,550 B2  7/2010  Piekarz
8,260,544 B2  9/2012  Kawa
(Continued)

FOREIGN PATENT DOCUMENTS

CN   101083018 A   12/2007
CN   101509777 A   8/2009
(Continued)

OTHER PUBLICATIONS

"Digital Radio Action Plan Report" (https://www.gov.uk/government/publications/traffic-and-travel-services-digital-radio-action-plan-report) [Retrieved from the internet Oct. 4, 2013]. This document discloses on p. 5 that "It would be possible to continue to provide traffic data to existing TMC-enabled vehicles by having an in-vehicle adapter which took the TPEG service from DAB, translated it into TMC and rebroadcast it within the vehicle using a low power RDS.FM transmitter".
(Continued)

*Primary Examiner* — Hongmin Fan

(57) ABSTRACT

A system for providing travel and traffic information to an occupant of a vehicle, the system comprising: an electronic device 12" positionable in the vehicle; a remote server 16' arranged to provide travel information based on a determined position of the electronic device 12"; and an in-vehicle radio receiver unit 15' comprising means for audio and/or visual output of travel information to the vehicle occupant. The electronic device 12", for example in the form of a vehicle cigarette lighter adapter (CLA), comprises a plug that is insertable into an in-vehicle power supply socket
(Continued)

for providing power to the electronic device. The position of the electronic device 12" is determined by a GPS receiver 220. The electronic device 12" also comprises a network transceiver 224 for communicating with the remote server 16' via a wireless telecommunications network and a radio transmitter 226. The network transceiver 224 is arranged to demand and receive travel information from the remote server 16' based on the determined position, and the radio transmitter 226 is arranged to transmit the received travel information to the in-vehicle radio receiver unit 15'.

23 Claims, 4 Drawing Sheets

(51) Int. Cl.
*G08G 1/0967* (2006.01)
*H04W 4/04* (2009.01)
*H04W 4/00* (2009.01)
*H04W 4/06* (2009.01)
*H04W 4/14* (2009.01)

(52) U.S. Cl.
CPC . *G08G 1/096741* (2013.01); *G08G 1/096775* (2013.01); *H04W 4/008* (2013.01); *H04W 4/04* (2013.01); *H04W 4/06* (2013.01); *H04W 4/14* (2013.01)

(56) References Cited

U.S. PATENT DOCUMENTS

| | | | |
|---|---|---|---|
| 8,897,708 | B2 | 11/2014 | Witkowski et al. |
| 2003/0033413 | A1* | 2/2003 | Willson, Jr. ............ H04L 29/06 709/227 |
| 2005/0054400 | A1* | 3/2005 | Seick .................... H04B 1/3822 455/575.9 |
| 2006/0264246 | A1 | 11/2006 | Piekarz |
| 2008/0165984 | A1* | 7/2008 | Yun ..................... H04M 1/6091 381/86 |
| 2008/0255754 | A1 | 10/2008 | Pinto |
| 2009/0115656 | A1* | 5/2009 | Raman .................... G01S 19/47 342/357.24 |
| 2009/0210152 | A1 | 8/2009 | Kawa |
| 2009/0275299 | A1* | 11/2009 | Buch ...................... H04H 20/22 455/161.1 |
| 2009/0319188 | A1* | 12/2009 | Otto ........................ G01C 21/32 701/300 |
| 2010/0080201 | A1* | 4/2010 | Rosenblatt .............. H04W 4/02 370/338 |
| 2011/0098065 | A1* | 4/2011 | Honda ................... G08G 1/093 455/466 |
| 2012/0268306 | A1 | 10/2012 | Coburn et al. |
| 2012/0309388 | A1* | 12/2012 | Moosavi ........... H04W 52/0254 455/426.1 |
| 2012/0314864 | A1* | 12/2012 | Ramprasad ........... H04L 63/065 380/270 |
| 2013/0054107 | A1* | 2/2013 | Harvie ................. G01G 19/086 701/99 |
| 2013/0130626 | A1* | 5/2013 | Witkowski ............. G07C 5/008 455/41.2 |

FOREIGN PATENT DOCUMENTS

| | | |
|---|---|---|
| CN | 102095422 A | 6/2011 |
| JP | 2001044924 A | 2/2001 |
| JP | 2002531975 A | 9/2002 |
| JP | 2003501944 A | 1/2003 |
| JP | 2004516466 A | 6/2004 |
| JP | 2011103542 A | 5/2011 |
| JP | 2011525615 A | 9/2011 |
| JP | 2012221227 A | 11/2012 |
| WO | 0072463 A2 | 11/2000 |
| WO | 2008083983 A1 | 7/2008 |

OTHER PUBLICATIONS

Rick Waalders, Sjoerd Perfors: "Flitsmeister (iPhone app)", iTunes, Jul. 25, 2011. XP002721687, Retrieved from the Internet: URL:http://web.archive.org/web/20110725200412/http://itunes.apple.com/nl/app/flitsmeister/id354936286?mt=8 [retrieved on Mar. 13, 2014].
International Search Report dated Apr. 29, 2014 of International Application No. PCT/EP2013/076249.

* cited by examiner

SYSTEM AND METHOD FOR PROVIDING ALERT NOTIFICATIONS TO A VEHICLE OCCUPANT

CROSS-REFERENCES TO RELATED APPLICATIONS

The present application is the National Stage of International Application No. PCT/EP2013/076249, filed Dec. 11, 2013 and designating the United States, which claims priority from United Kingdom Patent Application No. 1222198.2, filed on Dec. 11, 2012. The entire content of these applications is incorporated herein by reference.

FIELD OF INVENTION

The present invention relates to the provision of an alert notification to the occupant of a vehicle, and is concerned particularly, although not exclusively, with a low cost system and method for providing relevant travel, e.g. traffic event, messages to a vehicle occupant using an existing wireless communications network and an in-vehicle radio receiver.

BACKGROUND TO HE INVENTION

Navigation devices, such as Portable Navigation Devices (PNDs) or built-in satellite navigation devices, are commonly employed in automobiles to calculate travel routes and to provide guidance along said routes. Navigation devices are typically provided with the functionality to wirelessly receive travel information such as traffic events, accidents, closed roads and the like, in order, for example, to utilise the information to determine travel routes that take account of delays on the road network between an origin and destination. Although the route calculation and navigation functions are fundamental to the overall utility of PNDs, it is also possible to use the device purely for information display, or "free-driving", in which only map and travel information relevant to the current device location is displayed, and in which no route has been calculated and no navigation is currently being performed by the device. Such a mode of operation is often applicable when the user already knows the route along which it is desired to travel and does not require navigation assistance.

The travel information that is provided to such navigation devices can come directly from governmental agencies, and, for example, can be in the form of TMC (Traffic Message Channel) messages that are typically broadcast using conventional FM radio, or more recently on digital radio and satellite radio channels. RDS-TMC is currently an International standard for delivery of traffic information to navigation devices. Due to the low bandwidth available in the RDS-TMC system, it is only possible to provide travel information in relation to significant road junctions along defined portions of the road network, e.g. national and regional highways. More specifically, in the RDS-TMC system, travel information is encoded using a set of a predefined event codes and location tables, which assign a location code to each of the road junctions within a region. The encoded TMC messages are broadcast, and decoded by a RDS-TMC receiver, such as one associated with a navigation device, by matching event and location codes against one or more look-up tables. As known in the art, such RDS-TMC receivers can be internal within the navigation device, or can be combined with an external antenna that is connectable to the navigation device (e.g. see WO 2011/072714 A1).

In part due to the limitations of RDS-TMC, travel information has been provided by real-time traffic monitoring systems utilising various technologies, such as mobile phone data exchanges (e.g. see WO 02/45046 A2), fixed cameras, GPS fleet tracking. One example of such a real-time traffic monitoring system is the TomTom HD Traffic service, created and provided by TomTom International B.V., which fuses data from multiple sources, including cellular floating phone data, GPS-based probe data and conventional data feeds from third parties, such as local authorities, and data from loop systems in the road, to create significantly more accurate and detailed travel event data. In the case of the TomTom HD Traffic Service, rather than broadcasting messages, a bi-directional mobile telecommunication channel, such as GPRS, GSM, or the like, is used to provide the travel information to navigation devices. This provides a greater available data bandwidth than is available in RDS-TMC, and, together with the use of a dynamic location referencing system, such as OpenLR, which allows an event to be associated with any location on a digital map (and not just pre-coded locations), enables the provision of travel information at a more granular level.

Many built-in vehicle navigation devices, i.e. that are integrated into the vehicle system, and many older navigation devices are not, however, capable of establishing a connection with a mobile telecommunications network, and thus are unable to receive the higher quality travel information provided by suppliers, such as TomTom International B.V. or INRIX, Inc. The Applicant has therefore recognised that it would be desirable to provide a solution to allow the travel information from such suppliers to be received by these built-in or older navigation devices. Furthermore, the Applicant has recognised that it would also be beneficial to provide a solution to allow travel information to be provided to drivers that do not own a navigation device.

SUMMARY OF THE INVENTION

In accordance with a first aspect of the invention, there is provided an electronic device for providing travel information to an occupant of a vehicle, the electronic device comprising a housing and a plug extending therefrom, the plug being insertable into an in-vehicle power supply socket for providing power to the electronic device, the housing comprising: a network transceiver for communicating with a wireless telecommunications network; and a radio transmitter, wherein the network transceiver is arranged, in use, to communicate with a remote server via the network for determining a position of the electronic device and to receive travel information from the remote server via the network based on the determined position, and wherein the radio transmitter is arranged, in use, to transmit the received travel information to an in-vehicle radio receiver unit.

Thus, in accordance with the invention, there is provided an electronic device connectable to an in-vehicle power supply, and which is capable of bi-directional communication with a remote server via a wireless telecommunications network. The electronic device further comprises a radio transmitter for transmitting information received from the remote server, thereby allowing the device to function as an in-vehicle radio broadcasting device.

In one set of embodiments the network transceiver is arranged to communicate with a remote server via the network to determine a position of the electronic device. For example, the network transceiver may comprise a GSM or GPRS mobile telecommunications device. In addition, or alternatively, the device may comprise a global navigation satellite system (GNSS) receiver such as a Global Positioning System (GPS) receiver. The GPS receiver may be arranged, in use, to determine a position of the electronic device. The Applicant has realised that it can be beneficial to utilise a GPS device in addition to, or instead of, a GSM or GPRS device to improve positioning accuracy for the electronic device.

Thus in accordance with a second aspect of the invention, there is provided an electronic device for providing travel information to an occupant of a vehicle, the electronic device comprising a housing and a plug extending therefrom, the plug being insertable into an in-vehicle power supply socket for providing power to the electronic device, the housing comprising: a network transceiver for communicating with a wireless telecommunications network; a global navigation satellite system (GNSS) receiver; and a radio transmitter, wherein the GNSS receiver is arranged, in use, to determine a position of the electronic device and the network transceiver is arranged, in use, to communicate with a remote server via the network for receiving travel information from the remote server via the network based on the determined position, and wherein the radio transmitter is arranged, in use, to transmit the received travel information to an in-vehicle radio receiver unit.

It will be appreciated that using a GNSS, e.g. GPS, receiver to determine a position of the electronic device can be more accurate than relying on mobile network positioning information alone. An advantage of using the GNSS, e.g. GPS, receiver for positioning is that the network transceiver need only receive travel information and not positional information, so the amount of data transmitted via the wireless telecommunications network can be reduced. However, it is envisaged that in at least some embodiments the network transceiver may also be arranged, in use, to communicate with a remote server via the network for determining a position of the electronic device. A hybrid positioning technique such as assisted GPS (A-GPS) can be helpful under certain conditions, for example using network resources to locate the GPS satellites in poor signal conditions, to improve the start-up performance of the device.

Thus in more general terms it will be appreciated that the present invention provides an electronic device that acts as a gateway for travel information to be transferred from a remote server to an in-vehicle radio receiver unit based on a determined position of the electronic device. The geographic position of the electronic device may be determined by various means.

In accordance with a third aspect of the invention, there is provided an electronic device for providing travel information to an occupant of a vehicle, the electronic device comprising a housing and a plug extending therefrom, the plug being insertable into an in-vehicle power supply socket for providing power to the electronic device, the housing comprising: means for determining a position of the electronic device; a network transceiver for communicating with a wireless telecommunications network; and a radio transmitter, wherein the network transceiver is arranged, in use, to communicate with a remote server via the network to receive travel information from the remote server via the network based on the determined position, and wherein the radio transmitter is arranged, in use, to transmit the received travel information to an in-vehicle radio receiver unit.

In various embodiments of the invention, the means for determining a position of the electronic device may comprise a global navigation satellite system (GNSS) receiver in the electronic device and/or the network transceiver in the electronic device being arranged, in use, to communicate with a remote server via the network for determining a position of the electronic device. The network transceiver may periodically receive travel information from the remote server via the network based on the determined position. For example, the remote server may be programmed to send updated travel information every two minutes whenever a network connection is established with the device. Especially where the position of the electronic device is determined, at least partly, by a GNSS receiver in the electronic device, then the network transceiver may be arranged, in use, to communicate the determined position of the device to the remote server so that the server can determine whether updated travel information is available based on the determined position. For example, the electronic device may be programmed to send its determined position to the remote server periodically, e.g. every two minutes, whenever a network connection is established. The server may then use the determined position to identify any relevant traffic information and send an update when appropriate. It will be appreciated that the device determining its own position using a GNSS receiver means that travel information can be better tailored to a vehicle's location in real time and the burden on the network connection may be reduced. In some examples the network transceiver may be arranged, in use, to demand travel information from the remote server based on the determined position. For example, the network transceiver may send its determined position to the remote server more frequently when the device determines that its position is changing rapidly.

The plug of the electronic device preferably comprises a cigarette lighter adapter (CLA), which is insertable into a vehicle cigarette lighter socket. It will be appreciated, however, that the plug could be of any suitable form, and could, for example, comprise a universal serial bus (USB) plug insertable into an in-vehicle USB socket.

The network transceiver preferably comprises a modem, such as a GPRS or GSM modem, capable of communicating with a mobile telecommunication network. The network transceiver therefore preferably comprises a subscriber identity module (SIM) for receiving a SIM card for subscription to a wireless telecommunications network.

The radio transmitter may comprise an analogue radio transmitter, such as a FM transmitter. The FM transmitter preferably comprises an FM RDS transmitter, i.e. comprises an Radio Data System (RDS) encoder. Alternatively the radio transmitter may comprise a digital radio transmitter, such as a DAB radio or HD radio transmitter. Preferably the radio transmitter is arranged to transmit the received travel information at FM or DAB radio frequencies between about 30 and 2000 MHz. The FM frequency band is 88.1-108.1 MHz while DAB typically uses spectra that have been allocated in Band III (174-240 MHz) and L band (1452-1492 MHz). It will be understood that such a radio transmitter can be distinguished from a Bluetooth transmitter that is arranged to broadcast over short distances using frequencies in the ISM band from 2400-2480 MHz. However, it is discussed below that the electronic device may optionally comprise an additional short-range, e.g. Bluetooth, communication unit to enable communication with another device such as a mobile telephone or "smart" phone, separately from communication with an in-vehicle radio receiver unit.

As will be appreciated, each of the components of the electronic device will be operably connected, directly or indirectly, to allow for the transfer of power and/or data therebetween. It will also be appreciated that the electronic device will comprise one or more processing units programmed in a manner to support the operation of the device, and one or more memory units.

The electronic device may, in embodiments, further comprise a socket to which an external device can be physically connected, e.g. to allow power and/or data transfer to the external device (such as for charging thereof). The socket may of any type as desired, but preferably comprises one or more USB ports.

The electronic device may, in embodiments, comprise one or more status indicators, such as LEDs. The status indicators can be used to indicate the current status of the device to the user, e.g. active, inactive, currently receiving a traffic message, etc.

In some embodiments of the present invention, the network transceiver is arranged, in use, to communicate with a remote server via the network for determining a position of the electronic device, either alone or in combination with a GNSS receiver. In preferred embodiments, at least an approximate location is determined by the network transceiver, which is communicated to the remote server whereupon a more accurate position can be determined. The approximate location can be, for example, a cell ID of the telecommunications network. Thus, for example, in some embodiments, the network transceiver can be arranged to communicate location information to the remote server indicative of the position of the network transceiver (and thus the electronic device, and correspondingly the vehicle in which the electronic device is carried). In addition, or alternatively, the electronic device may comprise a GNSS receiver that is arranged to determine the position of the device, and hence of the vehicle. This location information can then be used by the remote server to determine relevant travel information based on the current position of the vehicle; the determined travel information being transmitted by the remote server to the electronic device. The term "travel information" is used herein to refer information or messages about events effecting the flow of traffic along roads. The messages may relate, in examples, to traffic, weather, accidents, black spots, speed cameras, etc.

Although in some preferred embodiments, the position of the electronic device is determined in an hybrid manner, i.e. using approximate location information transmitted from the network transceiver, which is then refined at the remote server, it will be appreciated that the position of the electronic device can be determined using the connection between the network transceiver and the wireless telecommunications network wholly at the network transceiver or at the remote server. Further details concerning the manner by which the position of the electronic device can be determined using the connection between the network transceiver and the wireless telecommunications network can be found in WO 02/45046 A2; the entire content of which is incorporated herein by reference.

In some other preferred embodiments the position of the electronic device is determined in an hybrid manner, i.e. using approximate location information transmitted from the network transceiver and more exact location information determined by a GNSS receiver. In some other preferred embodiments the position of the electronic device is determined wholly by a GNSS receiver.

As will be appreciated, the position of the electronic device will be continually determined as the vehicle travels along the road network. The determined position of the vehicle over time can be used by the remote server to determine other attributes of the vehicle, such as one or more of heading, speed, and a predicted route of travel.

The remote server forms part of a real-time traffic monitoring system, and thus comprises a database of travel information for a road network, such as traffic jams, accidents, closed roads, etc; said database continuously being updated using information from a plurality of vehicles currently traversing the road network. Accordingly, at the remote server, the determined position of the electronic device on the road network can be used to collect relevant travel information for the vehicle carrying the electronic device. In embodiments, the determined heading, speed and/or predicted route of travel can also be used to determine the relevant travel information for the vehicle.

The travel information deemed relevant for a vehicle can be any travel information within a geographic area around, or ahead of, the current position of the vehicle. The geographic area can be of any shape, e.g. circular, square, etc. For example, the geographic area can be centred at the current position of the vehicle. Alternatively, the geographic area can be located such that the current position of the vehicle is at the edge of the area, and the area extends outwards along a determined heading of the vehicle. The size of the geographic area can be predefined, e.g. a default size could be used for all users. Alternatively, in other embodiments, a user may be able to select a desired size of the geographic area.

The travel information deemed relevant for a vehicle can be limited to roads of a particular importance, e.g. of a certain functional road class. For example, one user may only want to receive travel information for major highways, but not minor roads, while another user may want to receive travel information for all roads regardless of functional road class.

The remote server preferably therefore comprises a database of users and associated user preferences, e.g. desired size of geographic area, functional road classes for which information is desired, etc, and these user preferences are used to determine the relevant travel information for an electronic device.

Once the relevant travel, e.g. traffic, information for a vehicle has been determined, a traffic message for the vehicle is created, and preferably stored, at the remote server. In preferred embodiments, the traffic message has an associated expiration time, e.g. a number of minutes, such that a new traffic message is created once the expiration time has elapsed. As will be appreciated, each traffic message is preferably stored at the remote server with an identifier representative of the vehicle for the which the traffic message has been created.

The created traffic message can be in any suitable format as desired, e.g. based on how the traffic message is to be used by the electronic device. For example, the created traffic message can be in the form of a text message, e.g. "traffic on the road ahead for the next two junctions" or the like. The created traffic message may also be encoded in a standard format, such as TMC, Alert-C or TPEG, or in a proprietary format, such as one used by TomTom or INRIX to transmit travel information. As will be appreciated, whilst the travel information is of a high accuracy, the level of detail of the travel information in the traffic message varies based on the format of the message. For example, when the traffic message is a text message, the travel information is of a low level of detail. Conversely, when the traffic message is in a format that utilise a dynamic location referencing system, such as OpenLR, the travel information is of a high level of detail.

As discussed above, the remote server is arranged to transmit the created traffic message to the electronic device via the wireless telecommunications network for receipt by the network transceiver. Typically, the traffic messages are "pushed" to the electronic device from the server (while the electronic device is connected to the network). However, it is also envisaged that traffic messages can, in some embodiments, also be "pulled" from the remote server. For example, in embodiments, the electronic device may comprise a user interface means, such as an actuator, preferably in the form of a push button, for requesting the most recent traffic message to be sent to the network transceiver.

The electronic device may be arranged to be active whenever it is connected to a power source, i.e. the in-vehicle power supply. In other words, the network transceiver is arranged to be connected to the wireless telecommunications network, when the network is available, whenever power is received via the plug of the device.

In a preferred embodiment, the electronic device comprises means for determining when the vehicle (and thus electronic device) is stopped for at least a predetermined period of time, and thus no longer requires travel information to be received. Such a means has a substantial benefit of bandwidth consumption, since otherwise any powered electronic device in a parked vehicle would continue to receive travel information.

In a set of embodiments, the electronic device comprises one or more inertial measurement units (IMUs), such as one or more accelerometers, gyroscopes and the like, to monitor movements (velocity, orientation, etc) of the electronic device. When the measurements from the one or more IMUs detect that the vehicle in which the electronic device is stationary, or remains stationary for more than a predetermined period of time, then the network transceiver is arranged to be disconnected from the wireless telecommunications network. In another set of embodiments, such IMUs may not be needed to determine when the electronic device is stationery where a GNSS receiver is provided to determine positional information for the device. Accordingly the network transceiver may be arranged to disconnect from the network when the GNSS receiver determines that the vehicle remains stationary for a predetermined period of time. Similarly, upon a determination that the vehicle is moving again, then the network transceiver is arranged to reconnect to the network using the at least one inertial measurement unit (IMU) or GNSS receiver.

In other embodiments, alternatively or in addition, the remote server can be arranged to determine from the position, and optionally heading, velocity, etc, of the electronic device that the vehicle carrying the device is stationary, or has remained stationary for more than a predetermined period of time. When the remote server determines than the vehicle is and/or remains stationary, then it can be arranged to stop transmitting travel information to the device until such a time as the vehicle to begin moving again.

The electronic device may further comprise a short-range communication unit for enabling communication with an additional communication device having a display and a user interface, such as a mobile telephone, smart phone, tablet computer or the like. The short-range communication unit may comprise a Bluetooth device or a WiFi device. Such a short-range communication unit allows a user to input and/or adjust preferences and other settings of the system. For example, the user can utilise the user interface of the additional communication device to input and/or adjust one or more preferences in relation to determining the relevance of travel information at the remote server, e.g. the size of the geographic area, functional road classes for which travel information is desired, etc. Any input user preferences are communicated to the remote server via a telecommunications network as required by the additional communication device. Similarly, the user can utilise the user interface to input and/or adjust one or more preferences in relation to the manner by which received travel information is used by the electronic device. For example, and as will be discussed in more detail below, a user may select a voice to be used to audibly announce received travel information. Any input user preferences are communicated to the electronic device as required by the additional communication device using a short-range communication unit.

It is also envisaged that the user could input and/or adjust one or more preferences in relation to determining the relevance of travel information at the remote server, using a web portal accessible by a client device, such as a computer, that is not in communication with the electronic device.

In the present invention, the radio transmitter of the electronic device is arranged to transmit, i.e. broadcast, the travel information received from the remote server to an in-vehicle radio receiver unit. In preferred embodiments, the travel information will be broadcast in the format that is received from the remote server. Thus, for example, if the travel information is received in the form of a text message, e.g. using the unstructured supplementary serve data (USSD) protocol, then it will be retransmitted by the radio transmitter in the form of a text message. It is also envisaged, albeit in less preferred embodiments, however, that the travel information will be received in a first format from the remote server, converted into a second format at the electronic device, and then broadcast by the radio transmitter in the second format. For example, in such embodiments, travel information may be received by the electronic device in a proprietary format, and then converted into a standard format, such as a TMC or Alert-C message (using predefined location reference tables stored in a memory of the electronic device).

In an embodiment of the invention, the in-vehicle radio receiver unit to which the received travel information is broadcast comprises a vehicle audio system, which will typically be integrated in the vehicle. The vehicle audio system preferably comprises a RDS radio receiver, such that it can decode information received over RDS channels. In this embodiment, the radio transmitter of the electronic device preferably transmits the travel information, preferably in the form of a text message, using the Traffic Programme Identification (TP) and/or Traffic Announcements (TA) RDS channels.

The vehicle audio system may be arranged, in some embodiments, to display the received travel information as text on a display of the audio system. Alternatively, or in addition, the vehicle audio system may be arranged to output the received travel information audibly, preferably in spoken form, using one or more speakers of the audio system. In a preferred embodiment, the vehicle audio system therefore comprises a text-to-speech (TTS) capability.

In such embodiments, an interface means, e.g. actuator, of the electronic device may be used, when actuated by a user, to cause the radio transmitter to rebroadcast the last traffic message obtained from the remote server. This allows the vehicle occupant to cause the last traffic message to again be displayed and/or spoken on the vehicle audio system.

The radio receiver may comprise an RDS radio receiver for receiving, for example, TMC messages (i.e. an RDS-TMC receiver) or messages in another standard format, such as TPEG or Alert-C messages. Thus, the radio transmitter of the electronic device preferably transmits the travel information in these embodiments in a standard format, such as TMC or TPEG. The RDS-TMC receiver may be configured to decode TMC messages that are received from the electronic device. A benefit of transmitting TMC or TPEG messages to the in-vehicle radio receiver unit is that the coded feed can be received without interrupting audio output, unlike TP or TA traffic announcements that cut into a radio broadcast.

As is mentioned above, the radio transmitter preferably comprises an analogue FM RDS transmitter but may take the form of a digital e.g. DAB transmitter. The in-vehicle radio receiver unit may be arranged to receive FM radio or even digital (e.g. DAB) or satellite radio. In future it is envisaged that FM radio channels may be replaced with digital or satellite radio. It is possible that TMC messages could be transmitted directly from the electronic device to a digital e.g. DAB radio receiver unit. Preferably the in-vehicle radio receiver unit is arranged to receive travel information at FM or DAB radio frequencies between about 30 and 2000 MHz.

In another embodiment of the invention, the in-vehicle radio receiver unit to which the received travel information is broadcast comprises a vehicle navigation device having an integrated radio receiver or a radio receiver in an external antenna connected to a vehicle navigation device. The navigation device may be integrated in the vehicle, or may be a portable navigation device that can be removably mounted within the vehicle. The navigation devices in these embodiments, as will be appreciated, typically do not comprise a network transceiver that can be used to connect the device to the remote server of the invention and/or a short-range communication unit that can be used to pair the navigation device to another device, e.g. a mobile telephone, having such a network transceiver. Portable navigation devices may include portable, e.g. tablet computers that do not have a network connection, for example a tablet that is GPS-enabled but does not comprise a modem and/or SIM card.

The navigation device may be arranged, in some embodiments, to use the received travel information in addition to, or instead of, travel information received from other sources. For example, the navigation device may display the received travel information on a display and/or the navigation device may utilise the travel information when determining a route to be followed between an origin and a destination. The navigation device may be arranged, in some embodiments, to display the received travel information as text and/or graphics on a display.

The electronic device may be arranged to allow a user to find and/or select an available radio channel that can be used to transmit, i.e. broadcast the received travel information to the in-vehicle radio receiver unit. For example, a manual input interface of the electronic device may be used to tune the broadcast channel of the radio transmitter. However it can be distracting and potentially dangerous for a vehicle driver to tune the device. In a vehicle, the available radio channels will typically change constantly as the vehicle moves in and out of range of different radio stations. Furthermore, changes in the landscape can temporarily block radio signals and cause confusion. It is therefore preferable that the electronic device is arranged, in use, to identify an available radio channel that can be used to transmit the received travel information to the in-vehicle radio receiver unit. Preferably the electronic device is able to automatically select a transmission channel. The electronic device may be arranged, in use, to employ a method of identifying a radio transmission frequency as disclosed, for example, in US 2009/0130978 A1; the entire content of which is incorporated herein by reference.

The present invention further extends to a system comprising the electronic device and any one or more of the additional devices, servers and the like mentioned above.

Thus, for example, in accordance with another aspect of the invention, there is provided a system for providing travel information to an occupant of the vehicle, the system comprising: an electronic device positionable in a vehicle; and a remote server comprising means for determining a geographic position of the electronic device, the electronic device comprising a housing and a plug extending therefrom, the plug being insertable into an in-vehicle power supply socket for providing power to the electronic device, and the housing comprising: a network transceiver for communicating with a wireless telecommunications network; and a radio transmitter, wherein the network transceiver is arranged, in use, to receive travel information from the remote server via the network based on the determined position, and wherein the radio transmitter is arranged, in use, to transmit the received travel information to an in-vehicle radio receiver unit.

In accordance with another aspect of the invention, there is provided a system for providing travel information to an occupant of a vehicle, the system comprising: an electronic device positionable in the vehicle; and an in-vehicle radio receiver unit comprising means for audio and/or visual output of travel information to the vehicle occupant, the electronic device comprising a housing and a plug extending therefrom, the plug being insertable into an in-vehicle power supply socket for providing power to the electronic device, and the housing comprising: a network transceiver for communicating with a wireless telecommunications network; and a radio transmitter, wherein the network transceiver is arranged, in use, to communicate with a remote server via the network for determining a position of the electronic device and to receive travel information from the remote server via the network based on the determined position, and wherein the radio transmitter is arranged, in use, to transmit the received travel information to the in-vehicle radio receiver unit.

In accordance with another aspect of the invention, there is provided a system for providing travel information to an occupant of a vehicle, the system comprising: an electronic device positionable in the vehicle; a remote server comprising means for determining a geographic position of the electronic device; and an in-vehicle radio receiver unit comprising means for audio and/or visual output of travel information to the vehicle occupant, the electronic device comprising a housing and a plug extending therefrom, the plug being insertable into an in-vehicle power supply socket for providing power to the electronic device, and the housing comprising: a network transceiver for communicating with a wireless telecommunications network; and a radio transmitter, wherein the network transceiver is arranged, in use, to receive travel information from the remote server via the network based on the determined position, and wherein the radio transmitter is arranged, in use, to transmit the received travel information to the in-vehicle radio receiver unit.

In such systems the network transceiver communicates with a remote server via a wireless telecommunications network to determine a geographic position of the electronic device. This means that the electronic device does not necessarily have its own positioning system. However, as is described above, the electronic device may employ a hybrid positioning system that combines position information from a remote server with locally determined position information, for example using a GNSS receiver in the electronic device. More generally, various aspects of the present invention relate to a system in which the electronic device comprises means for determining a position of the electronic device.

In accordance with another aspect of the invention, there is provided a system for providing travel information to an occupant of a vehicle, the system comprising: an electronic device positionable in the vehicle; and a remote server arranged to provide travel information based on the determined position of the electronic device and to transmit said travel information via a wireless telecommunications network to the network transceiver in the electronic device; the electronic device comprising a housing and a plug extending therefrom, the plug being insertable into an in-vehicle power supply socket for providing power to the electronic device, the housing comprising: means for determining a position of the electronic device; a network transceiver for communicating with a wireless telecommunications network; and a radio transmitter; wherein the network transceiver is arranged, in use, to communicate with the remote server via the network to receive travel information from the remote server via the network based on the determined position, and wherein the radio transmitter is arranged, in use, to transmit the received travel information to an in-vehicle radio receiver unit.

In accordance with another aspect of the invention, there is provided a system for providing travel information to an occupant of a vehicle, the system comprising: an electronic device positionable in the vehicle; and an in-vehicle radio receiver unit comprising means for audio and/or visual output of travel information to the vehicle occupant; the electronic device comprising a housing and a plug extending therefrom, the plug being insertable into an in-vehicle power supply socket for providing power to the electronic device, the housing comprising: means for determining a position of the electronic device; a network transceiver for communicating with a wireless telecommunications network; and a radio transmitter; wherein the network transceiver is arranged, in use, to communicate with a remote server via the network to receive travel information from the remote server via the network based on the determined position, and wherein the radio transmitter is arranged, in use, to transmit the received travel information to the in-vehicle radio receiver unit.

In accordance with another aspect of the invention, there is provided a system for providing travel information to an occupant of a vehicle, the system comprising: an electronic device positionable in the vehicle; a remote server arranged to provide travel information based on the determined position of the electronic device and to transmit said travel information via a wireless telecommunications network to the network transceiver in the electronic device; and an in-vehicle radio receiver unit comprising means for audio and/or visual output of travel information to the vehicle occupant; the electronic device comprising a housing and a plug extending therefrom, the plug being insertable into an in-vehicle power supply socket for providing power to the electronic device, the housing comprising: means for determining a position of the electronic device; a network transceiver for communicating with a wireless telecommunications network; and a radio transmitter; wherein the network transceiver is arranged, in use, to communicate with the remote server via the network to receive travel information from the remote server via the network based on the determined position, and wherein the radio transmitter is arranged, in use, to transmit the received travel information to the in-vehicle radio receiver unit.

In such systems the means for determining a position of the electronic device may utilise local and/or remote determination of geographic position. In a set of embodiments the electronic device comprises a global navigation satellite system (GNSS) receiver for determining a geographic position of the electronic device. Alternatively, or in addition, in a set of embodiments the remote server comprises means for determining a geographic position of the electronic device.

The present invention in these further aspects may include any of the optional and preferred features described in relation to the first, second or third aspects of the invention. For example, the in-vehicle radio receiver unit may comprise a vehicle audio system or a navigation device. Similarly, the travel information may include information about traffic jams, road accidents, road closures or the like.

In accordance with another further aspect of the invention, there is provided a method for providing travel information to an occupant of a vehicle, the method comprising:

determining a geographic position of an electronic device positioned in the vehicle based on communications over a wireless telecommunications network between a network transceiver in the electronic device and a remote server;

determining travel information at the remote server based on the determined geographic position and transmitting said determined travel information via the network for receipt by the network transceiver;

transmitting the received travel information to an in-vehicle radio receiver unit using a radio transmitter in the electronic device; and outputting the travel information received at the in-vehicle radio receiver unit to the vehicle occupant.

In accordance with another further aspect of the invention, there is provided a method for providing travel information to an occupant of a vehicle, the method comprising:

determining a geographic position of an electronic device using a GNSS receiver in the electronic device;

determining travel information at a remote server based on the determined geographic position of the electronic device and transmitting said determined travel information via a wireless telecommunications network to a network transceiver in the electronic device;

transmitting the received travel information to an in-vehicle radio receiver unit using a radio transmitter in the electronic device; and outputting the travel information received at the in-vehicle radio receiver unit to the vehicle occupant.

In accordance with another further aspect of the invention, there is provided a method for providing travel information to an occupant of a vehicle, the method comprising:

determining a geographic position of an electronic device;

determining travel information at a remote server based on the determined geographic position of the electronic device and transmitting said determined travel information via a wireless telecommunications network to a network transceiver in the electronic device;

transmitting the received travel information to an in-vehicle radio receiver unit using a radio transmitter in the electronic device; and outputting the travel information received at the in-vehicle radio receiver unit to the vehicle occupant.

It will be appreciated that the invention according to these further aspects may comprise any or all of the features described in respect of the previous aspects of the invention, and vice versa. Thus, if not explicitly stated, the methods may comprise the steps of controlling the device to perform any of the functions described in relation to the system or device, and the devices or systems of the invention may be arranged to perform any of the method steps herein described. The device or system may comprise a set of one or more processors arranged to carry out the steps mentioned. Any step may be carried out by any one of the processors, or by multiple processors.

The present invention extends to a computer program product comprising computer readable instructions executable to perform a method according to any of the aspects or embodiments of the invention, or to cause an electronic device or navigation apparatus to perform such methods.

The present invention extends to a, preferably non-transitory, computer program product comprising computer readable instructions executable when run on an electronic device or navigation apparatus in accordance with any of the embodiments of the invention to cause a set of one or processors of the electronic device or navigation apparatus to perform the steps of any of the aspects or embodiments of the method described herein.

It will be appreciated that any of the further aspects of the invention may include any or all of the features of the invention described in relation to any other aspects and embodiments of the invention to the extent they are not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

A preferred embodiment of the present invention will now be described by way of example only, with reference to the accompanying diagrammatic drawings, in which.

DETAILED DESCRIPTION OF PREFERRED EMBODIMENTS

Figure 1:
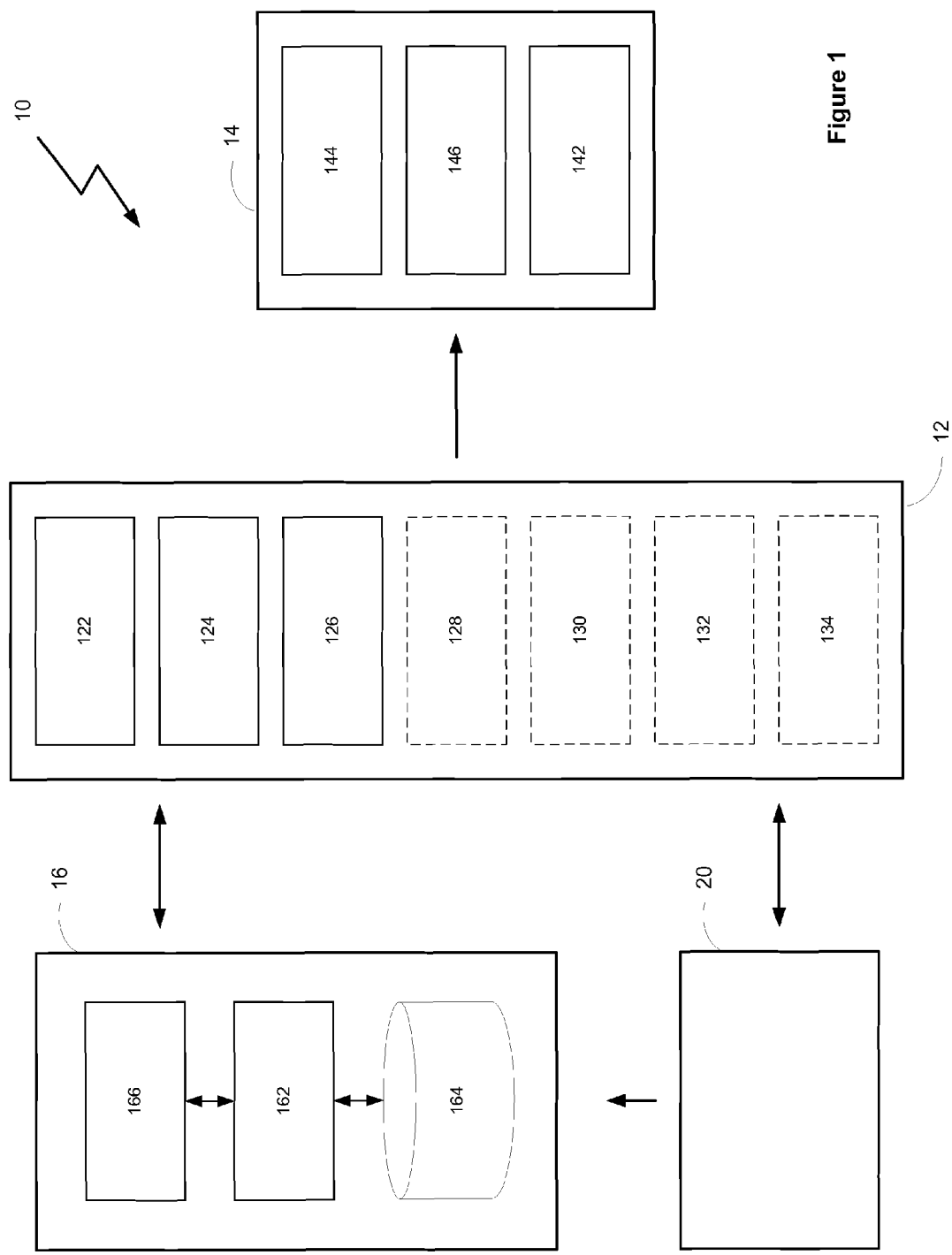
FIG. 1 shows schematically a system for providing travel information to a vehicle occupant, in accordance with a first embodiment of the present invention.

FIG. 1 shows a system 10 for providing travel information to a vehicle occupant, in accordance with a first embodiment of the present invention.

The system 10 comprises an electronic device 12 and an in-vehicle radio receiver unit 14 as part of the vehicle audio system which are located in the same vehicle. The system further comprises a remote server 16, which is arranged to communicate with the device 12 via a wireless telecommunications network, such as a GSM network. The device 12 is further in communication with a web portal or mobile app on a smartphone 20, which can communicate with the remote server 16. The device 12 is configured for one-way radio transmission to the in-vehicle unit 14.

The device 12 comprises a power connector 122 for connecting to an in-vehicle power source, such as a 12V DC power source as is commonly found in vehicles, e.g. a cigarette lighter plug. In addition, the device 12 has a mobile telecommunications unit 124 for bi-directional communication with the remote server 16. The mobile telecommunications unit 124 comprises a GSM or GPRS modem, a SIM housing and an antenna. The device 12 further comprises an FM RDS radio transmitter 126, which is used to broadcast information for receipt by the vehicle audio system 14. The device 12 further optionally comprises a short-range communication device 128, such as a Bluetooth device or a WiFi modem, which can be used to pair the device 12 with another device, such as the mobile phone 20.

The in-vehicle radio receiver unit 14 is, in this example, a vehicle entertainment system comprising an FM radio receiver 142 e.g. FM RDS receiver, speakers 144 and a visual display 146.

The remote server 16 comprises a traffic server 162 for processing data from a plurality of sources to determine real-time traffic information for a road network. For example, the traffic server 162 can fuse data from cellular floating phone data, GPS-based probe data, data from local authorities and data from loop systems in the road network. The remote server 16 further comprises a positioning engine 166 for continually determining the position and heading of the vehicle (carrying the device 12 and the audio system 14) as it traverses the road network. The remote server 16 further comprises a mobile telecommunications unit (not shown) for communicating with the device 12 via the network. The remote server 16 further comprises a database of user preferences 164 associated with one or more devices 12, and which can be used, instead of default settings, in determining relevant traffic information for a device 12.

In use, the electronic device 12, which may preferably take the form of a cigarette lighter adaptor (CLA), plugs into a power supply of a vehicle, such as the 12V DC supply commonly found in most vehicles. Upon connection to the power supply the device 12 activates the modem 124 which connects with the wireless telecommunications network using the SIM. While connected to a power source the modem 124 remains connected to the network and it communicates periodically with the network and/or is paged by the network. In particular, the modem 124 utilises cell ID to determine an approximate position of the device 12, which is passed to the positioning engine 166 of the remote server 16 via a text message in a USSD communication layer. The positioning engine uses the device's periodic communication to determine the accurate geographic location and heading of the vehicle on the road network. Each device 12 is associated with a default area around, or ahead of, the vehicle in which it is located. The default area is 5 km in this example, but the user is able to adjust this as a preference or the area may be determined based on a prediction of the route to be travelled by the vehicle carrying the device 12. A user is able to update the stored parameters, and select preferences, by accessing the database 164 via the web portal on a smart phone 20 and/or conveniently using a smartphone app. User preferences displayed by the smart phone 20 might include name, voice, area of interest, road class, etc. The user's smartphone is able to pair with the device 12 via the Bluetooth or WiFi device 128, for example.

Based on the position and heading of the device 12, and any associated preferences, such as area size, type of road for which travel information is desired (e.g. functional road class (FRC)), etc that are stored in the database 164, the traffic server 162 is used to determine relevant travel and traffic events in the vicinity of the device. These travel and traffic events are converted into a traffic message that is temporarily stored at the server 16. The server 16 pushes the created traffic message to the device 12 via the network.

The traffic message in this embodiment is in the form of a text message that is transmitted over the network to the modem 124 using the USSD protocol. The messages are broadcast by the FM RDS transmitter 126 of the device 12 using the TP and/or TA RDS channels, whereupon they are received by the radio receiver 142 of the audio system 14. Such messages will interrupt the normal radio audio broadcast.

The messages may simply be displayed as text on the display screen 146 of the vehicle. Alternatively, or in addition, if the device 12 has TTS software, the messages may be output as spoken messages by the vehicle's speakers 144.

The device 12 can further comprise an input device, such as a push button 132, that can be used to cause the device 12 to push the most recent message to the vehicle radio receiver 142 and/or to request the server 16 to push the latest notification to the device 12. As discussed above, the server 14 keeps a record of the most recent notification for each device 12, which notifications are given expiration periods. The device 12 collects the most recent notification. When the notification expires and a push request is received from a device 12, a new notification is built for the device.

The device 12 can also further comprise one or more sockets for external devices 130, such as a USB connector, which allows for, for example, the charging of an external device, such as a smartphone, tablet computer, etc, thereby maintaining the usual function of a CLA.

The device 12 may further comprise one or more inertial measurement units (IMUs) 134, such as an accelerometer, a gyroscope, etc, and which can be used to determine when the vehicle containing the device 12 is stationary for a predetermined period of time, e.g. is parked, but is also powered. When such a determination is made, then the modem 124 can be disconnected from the network such that it does not unnecessarily utilise bandwidth of the network. Upon a determination that the vehicle begins moving, then the modem 124 can be reconnected to the network.

Figure 2:
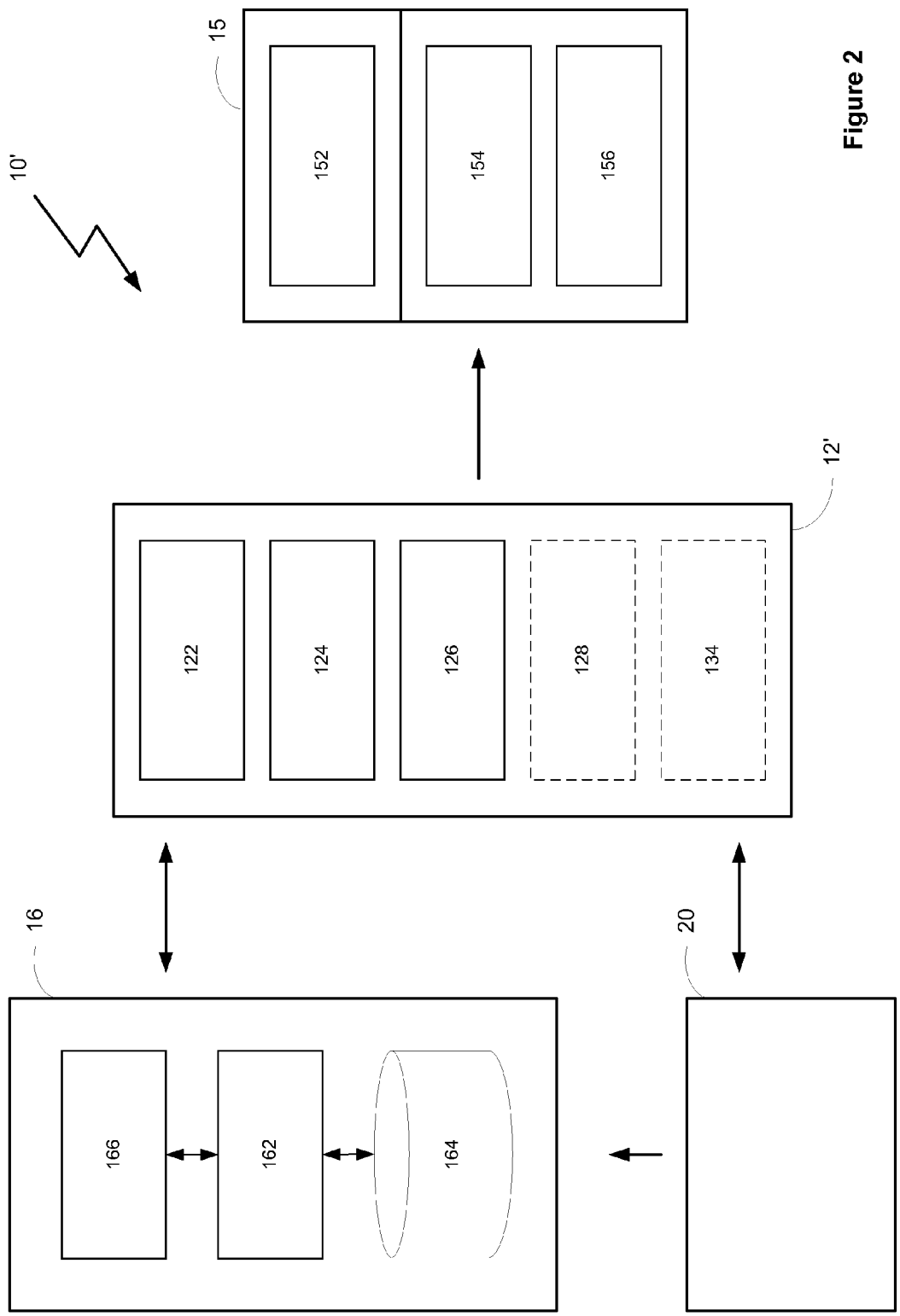
FIG. 2 shows schematically a system for providing travel information to a vehicle occupant, in accordance with a second embodiment of the present invention.

FIG. 2 shows a system 10' for providing travel information to a vehicle occupant, in accordance with a second embodiment of the present invention. Many components of the system are the same as discussed above in relation to FIG. 1, with the exception of the device 12' and the in-vehicle radio receiver unit, which in this case is a navigation device 15.

In this embodiment, the traffic messages received by the device 12' from the remote server 16 are encoded as TMC messages or in an Alert-C format. These TMC messages are broadcast by the FM RDS radio transmitter 126 of the device 12' and received by an RDS-TMC radio receiver 152 associated with the navigation device 15. The RDS-TMC receiver 152 may be integrated within the navigation device 15, or alternatively may be part of an external antenna that is connectable to the navigation device 15. The received TMC messages are decoded by the RDS-TMC receiver 152 and can then be used by the navigation device 15, for example, when determining a route.

Figure 3:
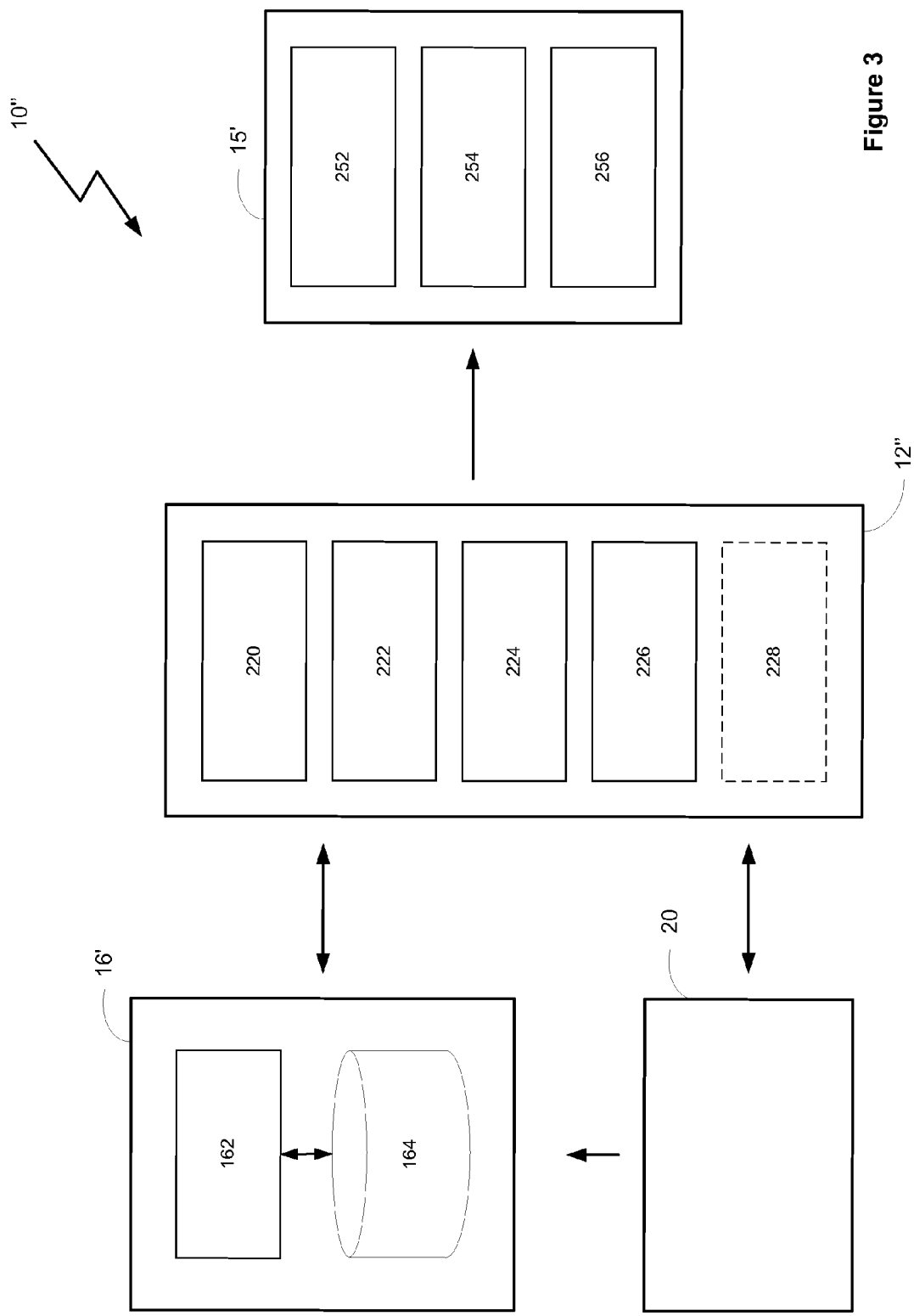
FIG. 3 shows schematically a system for providing travel information to a vehicle occupant, in accordance with a third embodiment of the present invention.

FIG. 3 shows a system 10" for providing travel information to a vehicle occupant, in accordance with a third embodiment of the present invention. Many components of the system are the same as discussed above in relation to FIGS. 1 and 2, with the exception of the device 12" and the remote server 16'.

In this embodiment, the remote server 16' is arranged to communicate with the device 12" via a wireless telecommunications, e.g. GSM or GPRS network in order to provide travel information. However the remote server 16' does not need to have a positioning engine, as the device 12" includes a GNSS, e.g. GPS, receiver 220 that can determine a geographic position of the device 12" without relying on the remote server 16' to determine its position. The GPS receiver 220 may be able to determine the position of the device 12" more accurately than using a GPRS network connection. Furthermore, communication between the device 12" and the remote server 16' may be limited to traffic messages rather than including position determining information as well, which can reduce the mobile data load.

As before, the remote server 16' comprises a traffic server 262 to provide real-time travel information and a database 264 of user preferences which can be used, instead of default settings, to determine relevant travel information for the device 12". Although not shown, the remote server 16' includes a mobile telecommunications transceiver arranged to communicate with the device 12".

In the device 12", the GPS receiver 220 determines an accurate position of the device 12" and passes this information to a mobile telecommunications network transceiver 224, such as a GSM or GPRS modem, that is in communication with the remote server 16' via a mobile telecommunications network (using a SIM card for subscription—not shown). The server 16' can then provide travel information based on the device's determined position.

The GPS receiver 220 can determine not only the geographic position of the device 12" but also its velocity and acceleration. The GPS receiver 220 can therefore determine when the vehicle is stationary. When it is determined that the vehicle has remained stationary for a predetermined period of time, then the device 12" may disconnect the modem 224 from the mobile network so as to remove unnecessary burden on the network. When it is detected that the vehicle is moving again, then the device 12' can reconnect the modem 224 to the mobile network.

As before, the device 12" comprises a power connector 222 for connecting to an in-vehicle power source, such as the cigarette lighter socket and an FM RDS radio transmitter 226 which is used to broadcast travel information to the in-vehicle radio receiver unit 15'. In addition, the device 12" may optionally include a further short-range communication device 228, such as a Bluetooth transceiver or a WiFi modem, which can be used to pair the device 12" with another communication device, such as a smart phone 20.

The in-vehicle radio receiver unit 15' is substantially the same as in the embodiment of FIG. 2, including an RDS-TMC receiver 252, speakers 254 and visual display 246. The in-vehicle radio receiver unit 15' may take the form of a car radio device or a navigation device.

During operation of the device 12", the GPS receiver 220 can continuously monitor the position of the device 12", and also speed, acceleration, etc and continuously or periodically transfer such information to the remote server 16'. The remote server 16' can then determine relevant traffic and travel information based on the information received from the device 12" and create traffic/travel messages e.g. TMC messages to be pushed back to the device 12" over the mobile telecommunications network, for example every two minutes. The mobile telecommunications network modem 224 receives the TMC messages, which are then broadcast by the radio transmitter 226 to the navigation (other in-vehicle) device 15. This means that any vehicle having a radio receiver unit 15' can take advantage of accurate and up-to-date travel/traffic information such as the TomTom Traffic service.

Figure 4:
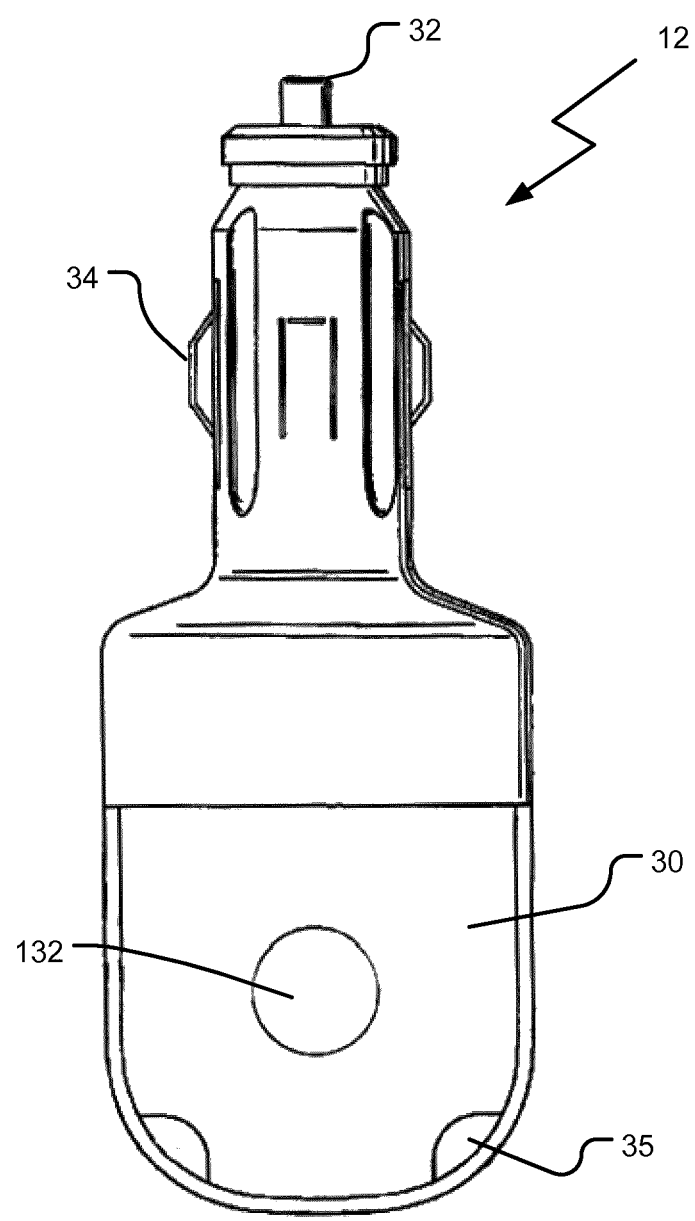
FIG. 4 shows a mobile communication device, in the preferred form of a cigarette lighter adaptor, for use in the system depicted in FIGS. 1 to 3.

FIG. 4 shows a preferred form for the electronic device 12 (or 12', or 12"), which is that of a cigarette lighter adaptor (CLA). The device 12 has a body portion 30 for housing the mobile telecommunications unit 124, the radio transmitter 126 and the short-range communication device 128, and any other components as desired, e.g. the IMU 134 or GPS receiver 220. On the outside of the body 30 is a push button 132, and a pair of LEDs 35 which are used to indicate the current status of the device. Resiliently mounted first contact 32 and second contacts 34 are used to connect the device to a power source of the vehicle (not shown).

The system provides for a vehicle occupant to receive travel information with a relatively inexpensive apparatus. The device 12, preferably but not essentially in the form of a CLA, communicates with a remote server via an existing telecommunications network from which it receives travel messages that are appropriate to its geographical location and heading. The geographical position of the device 12 may be determined by an on-board GNSS, e.g. GPS, receiver and/or by the positioning engine of a remote server. The device 12 then transmits the received travel messages as a radio signal to be received by the vehicle's existing audio system or a navigation device within the vehicle. This allows a vehicle without a navigation device to receive up to date and accurate information on the traffic ahead of the vehicle, e.g. to enable the driver to confirm traffic information on dynamic signage on the road. Furthermore, it allows vehicles with an existing navigation device, such as an integrated device, to receive and use traffic information from a third party source, which may be, and typically is, of a higher quality and/or more recently updated than the traffic information currently available to the navigation device.

It will be appreciated that whilst various aspects and embodiments of the present invention have heretofore been described, the scope of the present invention is not limited to the particular arrangements set out herein and instead extends to encompass all arrangements, and modifications and alterations thereto.

For example, whilst embodiments described in the foregoing detailed description refer to GPS, it should be noted that the electronic device may utilise any kind of position sensing technology as an alternative to (or indeed in addition to) GPS. For example, the electronic device may utilise other global navigation satellite systems (GNSS) such as the European Galileo system, Russian GLONASS, or any other national, regional or international navigation system. Equally, the electronic device is not limited to satellite-based systems but could readily function using ground-based beacons or any other kind of system that enables the device to determine its geographic location.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claims, but instead extends to encompass any combination of features or embodiments herein disclosed irrespective of whether or not that particular combination has been specifically enumerated in the accompanying claims at this time.

The invention claimed is:

1. An electronic device for providing travel information to an occupant of a vehicle, the electronic device comprising a housing and a plug formed in the housing and extending therefrom, the plug being insertable into an in-vehicle power supply socket for providing power to the electronic device, the housing further comprising:
   a network transceiver for communicating with a wireless telecommunications network;
   a global navigation satellite system (GNSS);
   a radio transmitter; and
   an actuator on an external surface of the housing of the electronic device,
   wherein the GNSS receiver is arranged, in use, to determine a position of the electronic device;
   wherein the network transceiver is arranged, in use, to communicate with a remote server via the network to receive travel information from the remote server via the network based on the determined position,
   wherein the radio transmitter is arranged, in use, to transmit the received travel information to an in-vehicle radio receiver unit, and
   wherein the actuator is arranged to, upon being actuated, cause the radio transmitter to retransmit a most recently received travel information to the in-vehicle radio receiver unit.

2. The device according to claim 1, wherein the network transceiver comprises a modem having a subscriber identity module (SIM) for receiving a SIM card for subscription to the wireless telecommunications network.

3. The device according to claim 1, wherein the plug comprises a cigarette lighter adapter (CLA) insertable into a vehicle cigarette lighter socket.

4. The device according to claim 1, wherein the radio transmitter comprises an FM RDS transmitter.

5. The device according to claim 1, wherein the device is arranged, in use, to identify an available radio channel for the radio transmitter to transmit the received travel information to the in-vehicle radio receiver unit.

6. The device according to claim 1, wherein the received travel information transmitted by the radio transmitter comprises at least one of: a text message; and an encoded location referenced message.

7. The device according to claim 1, wherein the travel information is received by the network transceiver from the remote server as one of a text message; and an encoded TMC message.

8. The device according to claim 1, wherein the radio transmitter is arranged to transmit the received travel information to an in-vehicle radio receiver unit as a text message using at least one of: a TP; and TA RDS channel.

9. The device according to claim 1, wherein the radio transmitter is arranged to transmit the received travel information to an in-vehicle radio receiver unit as an encoded location referenced message.

10. The device according to claim 1, wherein the network transceiver is arranged to automatically connect to the network when the device is connected the in-vehicle power supply socket.

11. The device according to claim 10, wherein the housing further comprises at least one inertial measurement unit (IMU) for determining when the vehicle remains stationary for a predetermined period of time, and wherein the network transceiver is arranged to disconnect from the network when such a determination is made.

12. The device according to claim 1, wherein the network transceiver is arranged to disconnect from the network when the GNSS receiver determines that the vehicle remains stationary for a predetermined period of time.

13. The device according to claim 12, wherein the network transceiver is arranged to reconnect to the network when the vehicle is determined to no longer be stationary using GNSS receiver.

14. The device according to claim 1, wherein the housing further comprises a short-range communication unit for enabling communication with an additional communication device.

15. The device according to claim 1, wherein the actuator is a push button.

16. The device according to claim 1, wherein the actuator is an input device.

17. An electronic device for providing travel information to an occupant of a vehicle, the electronic device comprising a housing and a plug formed in the housing and extending therefrom, the plug being insertable into an in-vehicle power supply socket for providing power to the electronic device, the housing further comprising:
- a network transceiver for communicating with a wireless telecommunications network;
- a radio transmitter, and
- an actuator on an external surface of the housing of the electronic device,
- wherein the network transceiver is arranged, in use, to communicate with a remote server via the network for determining a position of the electronic device and to receive travel information from the remote server via the network based on the determined position,
- wherein the radio transmitter is arranged, in use, to transmit the received travel information to an in-vehicle radio receiver unit, and
- wherein the actuator is arranged to, upon being actuated, cause the radio transmitter to retransmit a most recently received travel information to the in-vehicle radio receiver unit.

18. The device according to claim 17, wherein the network transceiver comprises a modem having a subscriber identity module (SIM) for receiving a SIM card for subscription to the wireless telecommunications network.

19. The device according to claim 17, wherein the plug comprises a cigarette lighter adapter (CLA) insertable into a vehicle cigarette lighter socket.

20. The device according to claim 15, wherein the radio transmitter comprises an FM RDS transmitter.

21. The device according to claim 17, wherein the actuator is a push button.

22. The device according to claim 17, wherein the actuator is an input device.

23. A non-transitory computer readable medium comprising instructions that, when executed by at least one processor of an electronic device, cause the electronic device to perform a method for providing travel information to an occupant of a vehicle, the method comprising:
- determining a geographic position of the electronic device;
- determining travel information at a remote server based on the determined geographic position of the electronic device and transmitting said determined travel information via a wireless telecommunications network to a network transceiver in the electronic device;
- transmitting the received travel information to an in-vehicle radio receiver unit using a radio transmitter in the electronic device for output to the vehicle occupant; and
- upon receiving an indication that an actuator on an external surface of the electronic device has been actuated, retransmitting the received travel information to an in-vehicle radio receiver unit using the radio transmitter.

* * * * *